(No Model.)
G. W. BEAN.
BACK GEAR CLUTCH FOR UPRIGHT DRILLS.
No. 246,710. Patented Sept. 6, 1881.
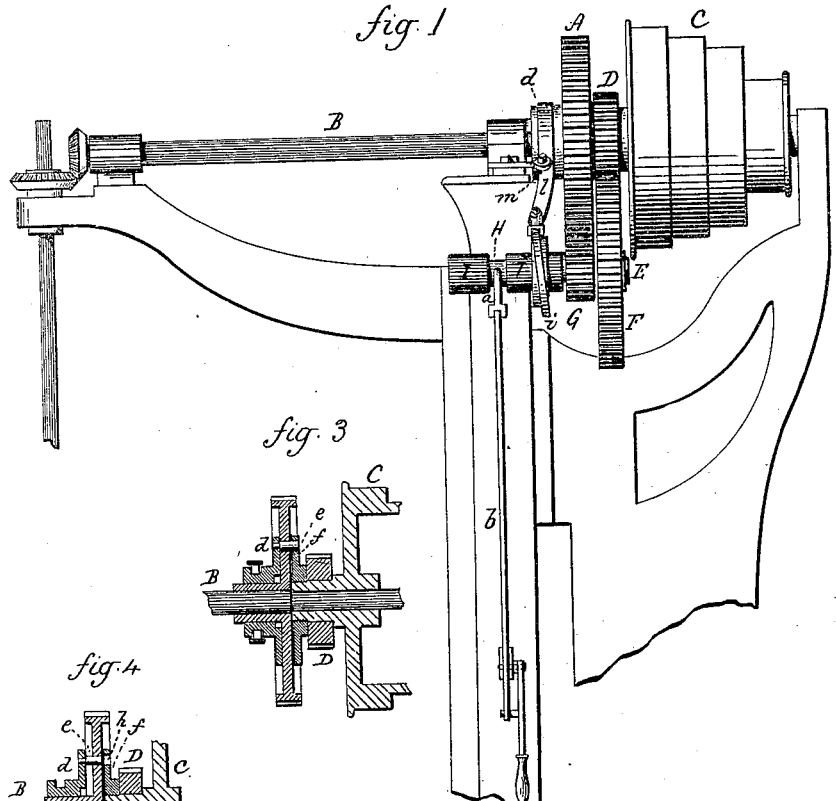
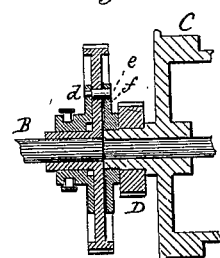
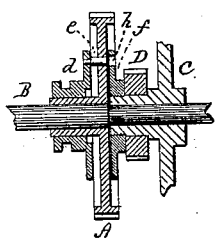
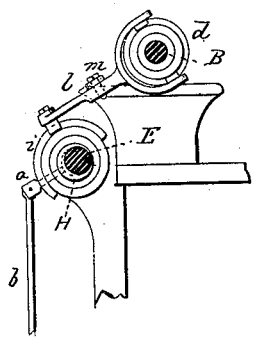

UNITED STATES PATENT OFFICE.

GEORGE W. BEAN, OF NEW HAVEN, CONNECTICUT, ASSIGNOR TO THE NEW HAVEN MANUFACTURING COMPANY, OF SAME PLACE.

BACK-GEAR CLUTCH FOR UPRIGHT DRILLS.

SPECIFICATION forming part of Letters Patent No. 246,710, dated September 6, 1881, Application filed June 23, 1881. (No model.)

*To all whom it may concern:*

Be it known that I, GEORGE W. BEAN, of New Haven, in the county of New Haven and State of Connecticut, have invented new Improvements in Back-Gear Clutches for Upright Drills; and I do hereby declare the following, when taken in connection with the accompanying drawings and the letters of reference marked thereon, to be a full, clear, and exact description of the same, and which said drawings constitute part of this specification, and represent, in—

Figure 1, a front view; Fig. 2, a partial side view; Figs. 3 and 4, longitudinal sectional views to illustrate the operation.

This invention relates to a device for shifting the back gear of upright drills, applicable to other machines requiring the back gear to be thrown out or in, according to the work to be done.

The gearing for driving an upright drill is usually so high from the floor that it cannot be conveniently reached by the workman; hence he is obliged to climb up to make the changes required to engage or disengage the back gear.

In the usual construction the gear-wheel A is made fast to the driving-shaft B. Loose upon the same shaft are the driving-pulleys C, and in connection therewith a pinion, D, which is revolved by the pulleys independently of the shaft.

The back gear, which consists of a wheel, F, and a pinion, G, working respectively in the pinion D and the gear-wheel A, is arranged loose upon the end E of a shaft, H, the said shaft H supported in bearings I, the end or part on which the wheel F and pinion G revolve being eccentric to the shaft H, as seen in Fig. 2, in the usual manner for back-gearing, so that the revolution of the pulleys connects the power to the shaft through the back-gearing, and so that the revolution of the driving-shaft is slower than that of the pulleys, whereby the advantage of the back-gearing is attained.

On account of the eccentricity of the shaft on which the wheels F and G revolve they may be thrown out or into connection with the pinion D and wheel A—that is to say, by turning the said eccentric shaft in one direction the back gears are thrown out, or in opposite directions are thrown into engagement with the gears A D, and when thrown out the gear-wheel A is connected to the pulleys, usually by a sliding bolt. This is the common and well-known arrangement of back-gearing, the adjustment of the back gear being entirely independent of the device which engages the main gear-wheel A with the driving-pulleys.

The object of this invention is to combine with the eccentric shaft, which throws the back gear in or out, a device which will correspondingly connect or disconnect the main wheel with the driving-shaft, and to bring the adjusting mechanism within reach of the workman; and the invention consists in the arrangement of a cam on the eccentric or back-gear shaft with a connection therefrom to the device which engages the main gear-wheel with the driving-pulley, so that when the back gear is thrown out a simultaneous engagement of the main gear-wheel with the pulleys takes place, and vice versa, as more fully hereinafter described.

The arm *a* is attached to and projects from the shaft H, and from this arm a rod, *b*, extends down within the reach of the workman, so that he may conveniently, through said arm *a*, impart the requisite rotation to the eccentric shaft to throw the back gear in or out, as the case may be.

*d* is a collar, here represented as on the hub of the gear-wheel A, and movable longitudinally thereon, but so as to revolve with the wheel. From the face of the collar *d* a stud, *e*, projects toward the wheel A, and through a corresponding hole in the wheel. On the opposite side of the wheel A, and in connection with the pulleys C or pinion D, is a corresponding collar, *f*, in which is a hole, *h*, corresponding to the hole through the wheel A and the stud *e* in the collar *d*, so that when the hole *h* coincides with the hole in the wheel and with the stud *e* the collar *d* may move toward the wheel, and so as to throw the stud *e* into engagement with the collar *f*, as from the position seen in Fig. 4 to that seen in Fig. 3, and so as to cause the wheel and pulleys to revolve together.

On the eccentric shaft is a cam, $i$, and between that and the collar $d$ is a lever, $l$, hung upon a fulcrum, $m$, one arm in connection with the cam, as seen in Fig. 1, the other in connection with the collar $d$, as seen in Figs. 1 and 2, so that as the cam $i$ is revolved it will impart a longitudinal movement to the collar $d$—that is to say, when the back gear or eccentric shaft is turned in the direction to throw off the back gear the cam will turn the lever to throw the collar $d$ toward the wheel and connect it with the pulleys, and vice versa; hence as the operator turns the back-gear shaft to throw out or in the back gear he at the same time accordingly makes or breaks the connection between the pulleys and the driving-shaft.

While the clutch-like collar $d$ is preferred as the best mechanism upon the driving-shaft to make the connection, other arrangements may be made and accomplish the same result. I therefore do not limit myself to the precise construction of parts herein described; neither do I limit myself to an upright drill or to the use of a rod in connection with the back-gear shaft.

What I claim is—

The combination of the principal gear fixed to the driving-shaft, pinion loose thereon and in connection with the device for applying the power, with an eccentric shaft carrying the back gears corresponding to the gears on the driving-shaft, and mechanism, substantially such as described, between the driving-shaft and the back-gear shaft, whereby the throwing out or in of the back gear simultaneously makes or breaks the connection between the loose gear on the driving-shaft and the said shaft, substantially as described.

GEORGE W. BEAN.

Witnesses:
J. H. SHUMWAY,
L. D. ROGERS.